United States Patent
Kuo

(10) Patent No.: US 9,606,951 B2
(45) Date of Patent: Mar. 28, 2017

(54) EXTERNAL ELECTRONIC DEVICE AND INTERFACE CONTROLLER AND EXTERNAL ELECTRONIC DEVICE CONTROL METHOD

(71) Applicant: VIA TECHNOLOGIES, INC., New Taipei (TW)

(72) Inventor: Chia-Ying Kuo, New Taipei (TW)

(73) Assignee: VIA TECHNOLOGIES, INC., New Taipei (TW)

( * ) Notice: Subject to any disclaimer, the term of this patent is extended or adjusted under 35 U.S.C. 154(b) by 573 days.

(21) Appl. No.: 14/152,343

(22) Filed: Jan. 10, 2014

(65) Prior Publication Data

US 2014/0317331 A1    Oct. 23, 2014

Related U.S. Application Data

(60) Provisional application No. 61/813,244, filed on Apr. 18, 2013.

(30) Foreign Application Priority Data

Oct. 3, 2013 (TW) ............................. 102135793 A

(51) Int. Cl.
 *G06F 13/40* (2006.01)
 *G06F 13/14* (2006.01)
 *G06F 9/44* (2006.01)

(52) U.S. Cl.
 CPC .......... *G06F 13/4027* (2013.01); *G06F 13/14* (2013.01); *G06F 9/4411* (2013.01); *G06F 2213/0042* (2013.01)

(58) Field of Classification Search
 CPC ............. G06F 3/04847; G06F 13/4027; G06F 9/4411; G06F 13/14; G06F 2213/0042; H04L 67/12
 See application file for complete search history.

(56) References Cited

U.S. PATENT DOCUMENTS 9,430,431 B2    8/2016  Ke
2002/0156952 A1  10/2002  Shono
(Continued)

FOREIGN PATENT DOCUMENTS

CN     1530803      9/2004
CN    102567249     7/2012
(Continued)

OTHER PUBLICATIONS

Chinese language office action dated Jul. 22, 2016, issued in application No. CN 201310541019.8.

*Primary Examiner* — Eric Oberly
(74) *Attorney, Agent, or Firm* — McClure, Qualey & Rodack, LLP

(57) ABSTRACT

An interface controller, coupling a device main body of an external electronic device to a host, is disclosed, which transmits a termination-on signal to the host prior to a mechanically stable state of a device main body of the external electronic device. When the device main body has not reached the mechanically stable state yet, the interface controller responds to the host with default link information in a delayed manner. The default link information is contained in the interface controller. When the device main body reaches the mechanically stable state, the interface controller transmits specific link information retrieved from the device main body to the host.

18 Claims, 3 Drawing Sheets

(56) References Cited

U.S. PATENT DOCUMENTS

| | | | |
|---|---|---|---|
| 2004/0221151 A1 | 11/2004 | Kajita | |
| 2006/0248387 A1* | 11/2006 | Nicholson | G06F 12/0804 714/22 |
| 2009/0193156 A1 | 7/2009 | Suematsu | |
| 2011/0063749 A1* | 3/2011 | Liu | G11B 25/043 360/71 |
| 2011/0106984 A1 | 5/2011 | Tanaka et al. | |

FOREIGN PATENT DOCUMENTS

| | | |
|---|---|---|
| TW | 552780 B | 9/2003 |
| TW | 201308092 | 2/2013 |

\* cited by examiner

EXTERNAL ELECTRONIC DEVICE AND INTERFACE CONTROLLER AND EXTERNAL ELECTRONIC DEVICE CONTROL METHOD

CROSS REFERENCE TO RELATED APPLICATIONS

This application claims the benefit of U.S. Provisional Application No. 61/813,244 filed on Apr. 18, 2013, the entirety of which is incorporated by reference herein, and this application further claims priority of Taiwan Patent Application No. 102135793, filed on Oct. 3, 2013, the entirety of which is incorporated by reference herein.

BACKGROUND OF THE INVENTION

Field of the Invention

The present invention relates to an external electronic device and the control method thereof and further relates to an interface controller for an external electronic device.

Description of the Related Art

To build a link between a host and an external electronic device, the host has to retrieve link information from the external electronic device. The link information about the external electronic device, however, may be contained in the device main body of the external electronic device, and could be provided after the device main body reaches a mechanically stable state. If a long time is required for the device main body to reach a mechanically stable state (e.g., it takes considerable time for a motor of a hard disc to rotate steadily), the host may erroneously determine that no external electronic device is coupled thereto because the link information is not timely received.

BRIEF SUMMARY OF THE INVENTION

An external electronic device in accordance with an exemplary embodiment of the invention comprises a device main body and an interface controller. The interface controller couples the device main body to a host and contains default link information. The interface controller transmits a termination-on signal to the host prior to the device main body reaches a mechanically stable state. When the device main body has not reached the mechanically stable state, the interface controller outputs the default link information contained therein in a delayed manner to respond to the host. When the device main body is in the mechanically stable state, the interface controller transmits specific link information retrieved from the device main body to respond to the host.

An interface controller in accordance with an exemplary embodiment of the invention comprises a memory and a computing unit. The interface controller couples a device main body of an external electronic device to a host. The memory is stored with program codes and contains default link information. The computing unit executes the program codes. Accordingly, a termination-on signal is transmitted from the interface controller to the host prior to the device main body reaches a mechanically stable state. When the device main body has not reached the mechanically stable state, according to the computing unit, the default link information contained in the memory is transmitted in a delayed manner to respond to the host. When the device main body is in the mechanically stable state, according to the computing unit, specific link information retrieved from the device main body is transmitted to respond to the host.

An external electronic device control method in accordance with an exemplary embodiment of the invention comprises: when the external electronic device is powered on, transmitting a termination-on signal to a host coupled to an external electronic device; receiving a default link information get request that the host issues based on the termination-on signal; responding to the default link information get request in a delayed manner when a device main body of the external electronic device has not reached a mechanically stable state; and transmitting specific link information retrieved from the device main body to respond to the host when the device main body is in the mechanically stable state.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description shows several exemplary embodiments carrying out the invention. This description is made for the purpose of illustrating the general principles of the invention and should not be taken in a limiting sense. The scope of the invention is best determined by reference to the appended claims.

Figure 1:
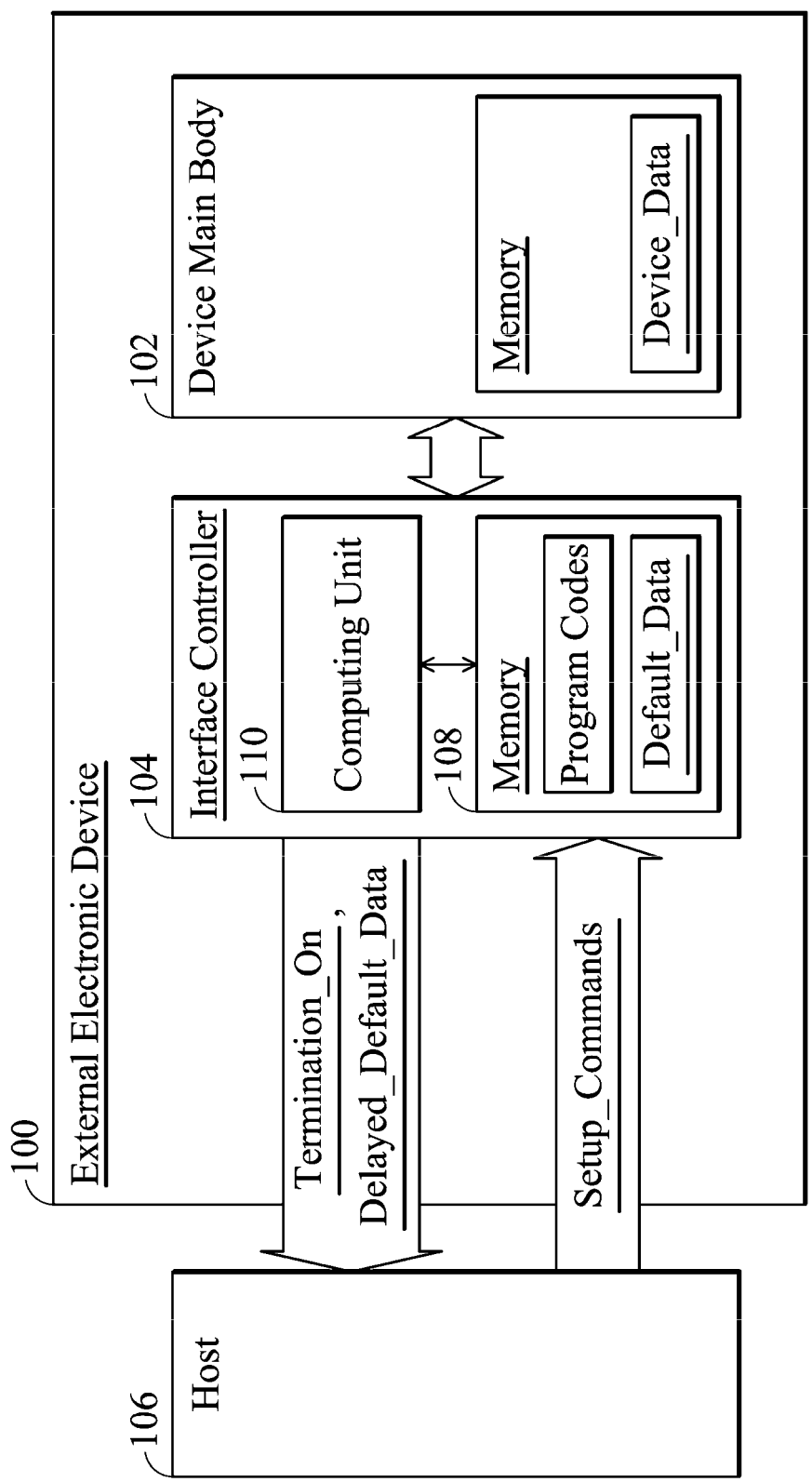
FIG. 1. depicts an external electronic device 100 in accordance with an exemplary embodiment of the invention.

FIG. 1 depicts an external electronic device 100 in accordance with an exemplary embodiment of the invention, which comprises a device main body 102 and an interface controller 104. The interface controller 104 couples the device main body 102 to a host 106 and contains default link information 'Default_Data'. When the external electronic device 100 is powered on, the interface controller 104 transmits a termination-on signal 'Termination_On' to the host 106 prior to a mechanically stable state of the device main body 102. In an exemplary embodiment, the interface controller 104 transmits the termination-on signal 'Termination_On' immediately once the external electronic device 100 is powered on. In another exemplary embodiment, the termination-on signal 'Termination_On' is transmitted from the interface controller 104 when the device main body 102 has already been started up for a while after the external electronic device 100 was powered on. Briefly, the interface controller 104 transmits the termination-on signal 'Termination_On' to the host 106 prior to the mechanically stable state of the device main body 102. In response to the termination-on signal 'Termination_On', the host 106 issues link information get requests 'Setup_Commands' for establishing a link between the host 106 and the external electronic device 100. When the device main body 102 has not reached the mechanically stable state, the interface controller 104 transmits the default link information 'Default_Data' (built in the interface controller 104) in a delayed manner, and thereby the link information get requests 'Setup_Commands' issued by the host 106 are responded to by the delayed default link information 'Delayed_Default_Data'. In this manner, there is enough time for the device main body 102 to reach the mechanically stable state. After the device main body 102 reaches the mechanically stable state, the interface controller 104 transmits specific link information 'Device_Data' retrieved from the device main body 102 to respond to the link information get requests 'Setup_Commands' issued by the host 106.

Based on stabilization time required for the device main body 102, the interface controller 104 plans a buffer time period. During the buffer time period, the interface controller 104 transmits the default link information 'Default_Data' in a delayed manner to respond to the host 106 by the delayed default link information 'Delayed_Default_Data'.

The termination-on signal 'Termination_On' is transmitted prior to the mechanically stable state of the device main body 102. In an exemplary embodiment, the host 106 is immediately informed of the power-on event of the external electronic device 100 and thereupon issues link information get requests 'Setup_Commands' for establishing a link with the external electronic device 100. In this manner, the host 106 timely detects the external electronic device 100 even if there is a long time required for the device main body 102 to reach the mechanically stable state. Note that the link information get requests 'Setup_Commands' that the host 106 issues for default link information are responded to in a delayed manner. Thus, the link information get requests 'Setup_Commands' for specific link information that has to be retrieved from the device main body 102 are properly postponed to be issued when the device main body 102 is in the mechanically stable state. In the mechanically stable state, the device main body 102 has finished the initialization process and is operating steadily. Thus, the specific link information 'Device_Data' contained in the device main body 102 is successfully provided to the host 106 and thereby the host 106 successfully performs an enumeration process on the external electronic device 100 and the link between the host 106 and the external electronic device 100 is successfully established.

Note that the external electronic device 100 may enter sleep mode when the host 106 enters sleep mode (e.g., S3 mode or S4 mode). When the host 106 wakes up, the stabilization time of the device main body 102 may have a problem rebuilding the link between the host 106 and the external electronic device 100. According to the disclosure, the termination-on signal Termination_On is transmitted prior to the mechanically stable state of the device main body 102. Thus, the host 106 is aware of the external electronic device 100 even if the device main body 102 has not reached the mechanically stable state. The host 106 who is just waking up from the sleep mode is prevented from performing a reconnect process which is designed to be performed when the link is failed. In an exemplary embodiment, the host 106 was copying data from the device main body 102 before the host 106 entered a sleep mode. When waking up, the host 106 automatically continues the interrupted copy without erroneously regarding the external electronic device 100 as a newly plugged-in device requiring a reconnect process. The copy action, therefore, is not erroneously abandoned.

In an exemplary embodiment, the default link information 'Default_Data' built in the interface controller 104 is set depending on the type of the device main body 102. For example, the default link information 'Default_Data' may involve: a device descriptor, a configuration descriptor and a BOS (Binary Device Object Store) type descriptor. The device descriptor includes (but not limited thereto): (1) the USB spec of the external electronic device 100; (2) the device class of the external electronic device 100; (3) the vender ID or the PID; and (4) the index of the device string. The configuration descriptor includes (but not limited thereto): (1) the amount of interfaces supported by the external electronic device 100; and (2) the maximum value of the current consumption. The BOS-type descriptor includes (but not limited thereto) the device capability type, which is necessary for establishing a USB 3.0 link.

Furthermore, the interface controller 104 of FIG. 1 comprises a memory 108 and a computing unit 110. The memory 108 is stored with program codes and contains the default link information 'Default_Data'. In some exemplary embodiments, the default link information 'Default_Data' are defined in the program codes, e.g. defined in the firmware. The computing unit 110 executes the program codes and thereby to operate interface controller 104. However, it is not intended to limit the architecture of the interface controller to that shown in FIG. 1. In other exemplary embodiments, the interface controller of the disclosure is an integrated circuit (e.g., implemented by a chip).

Figure 2:
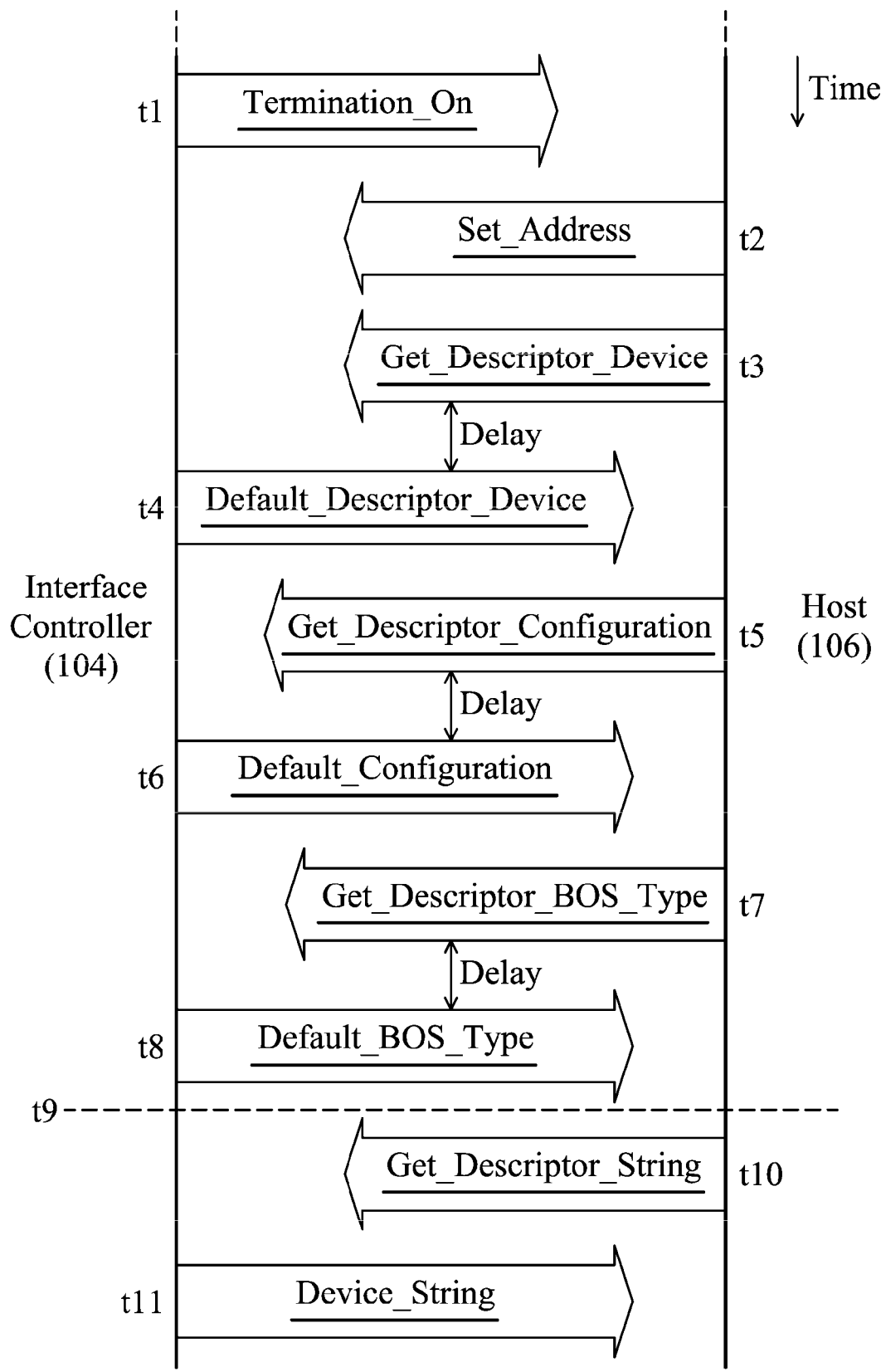
FIG. 2 is a timing diagram showing the communication between the interface controller 104 and the host 106 in accordance with an exemplary embodiment of the invention.

FIG. 2 is a timing diagram depicting the communication between the interface controller 104 and the host 106. When the external electronic device 100 is powered on, the interface controller 104 outputs a termination-on signal 'Termination_On' to the host 106 at time t1. Then, at time t2, the host 106 issues a connection address set command 'Set_Address' to the interface controller 104 in response to the termination-on signal 'Termination_On'. At time t3, the host 106 transmits a device descriptor get request 'Get_Descriptor_Device' to the interface controller 104. After a delay, at time t4, the interface controller 104 transmits the device descriptor 'Default_Descriptor_Device' built in the interface controller 104 to respond to the host 106. At time t5, the host 106 issues a configuration descriptor get request 'Get_Descriptor_Configuration' to the interface controller 104. After a delay, at time t6, the interface controller 104 transmits the configuration descriptor 'Default_Configuration' built in into the interface controller 104 to respond to the host 106. At time t7, the host 106 issues a BOS-type descriptor get request 'Get_Descriptor_BOS_Type' to the interface controller 104. After a delay, at time t8, the interface controller 104 transmits the BOS-type descriptor 'Default_BOS_Type' built in the interface controller 104 to respond to the host 106. At time t9, the device main body 102 reaches a mechanically stable state. Because of the delayed responses prior to the time point t9, the device string descriptor get request 'Get_Descriptor_String' requesting for the contents in the device main body 102 is successfully postponed to time t10 at which the device main body 102 is in the mechanically stable state. At time t11, the device main body 102 in the mechanically stable state steadily provides the interface controller 104 with the device string descriptor 'Device_String' to be transmitted to the host 106. In other exemplary embodiments, the device main body 102 may reach the mechanically stable state at any other time rather than the time point t9 during t1~t10. According to the disclosure, before the device string descriptor get request 'Get_Descriptor_String' requests the contents in the device main body 102, the device main body 102 has already reached the mechanically stable state.

The device descriptor get request 'Get_Descriptor_Device', the configuration descriptor get request 'Get_Descriptor_Configuration', the BOS-type descriptor get request 'Get_Descriptor_BOS_Type' and the device string descriptor get request 'Get_Descriptor_String' all belong to link information get requests 'Setup_Commands'. The device descriptor 'Default_Descriptor_Device', the configuration descriptor 'Default_Configuration' and the BOS-type descriptor 'Default_BOS_Type' are all contained in the interface controller 104 as the default link information 'Default_Data'. The device string descriptor 'Default_String', however, belongs to the specific link information 'Device_Data' retrieved from the device main body 102.

In other exemplary embodiments, a portion of the device string descriptor 'Device_String' is contained in the interface controller 104 rather than retrieved from the device main body 102. This portion of the device string descriptor 'Device_String' is transmitted to the host 106 in a delayed manner prior to the mechanically stable state of the device main body 102.

In some exemplary embodiments, the interface controller 104 acknowledges the reception of the Setup_Commands in a delayed manner. Thus, the default link information 'Default_Data' contained in the interface controller 104 is transmitted to the host 106 in a delayed manner.

In other exemplary embodiments, the default link information 'Default_Data' contained in the interface controller 104 is further divided into pieces to be transmitted to the host 106 in intervals. In this manner, the transmission of the default link information Default_Data is delayed by the separations between the different intervals. The information separation is based on the spec of the communication interface.

In an exemplary embodiment, the device main body 102 is a hard disc. The hard disc is not accessible until the motor of the hard disc rotates steadily. It may take several seconds to stabilize the rotation of a high capacity (e.g., up to 2 TB) hard disc. Because the initial requests for link information are responded in a delayed manner, there is enough time for the device main body 102 to stabilize mechanically. When the host 106 issues requests for specific link information contained in the device main body 102, the device main body 102 has already reached a mechanically stable state and is capable of responding to the host 106. In this manner, the external electronic device 100 is operated with high efficiency.

In an exemplary embodiment, the device main body 102 communicates with the interface controller 104 via a SATA (Serial Advanced Technology Attachment) interface, and the interface controller 104 communicates with the host 106 via a USB (Universal Serial Bus) interface. The device main body 102 may be a SATA hard disc.

Figure 3:
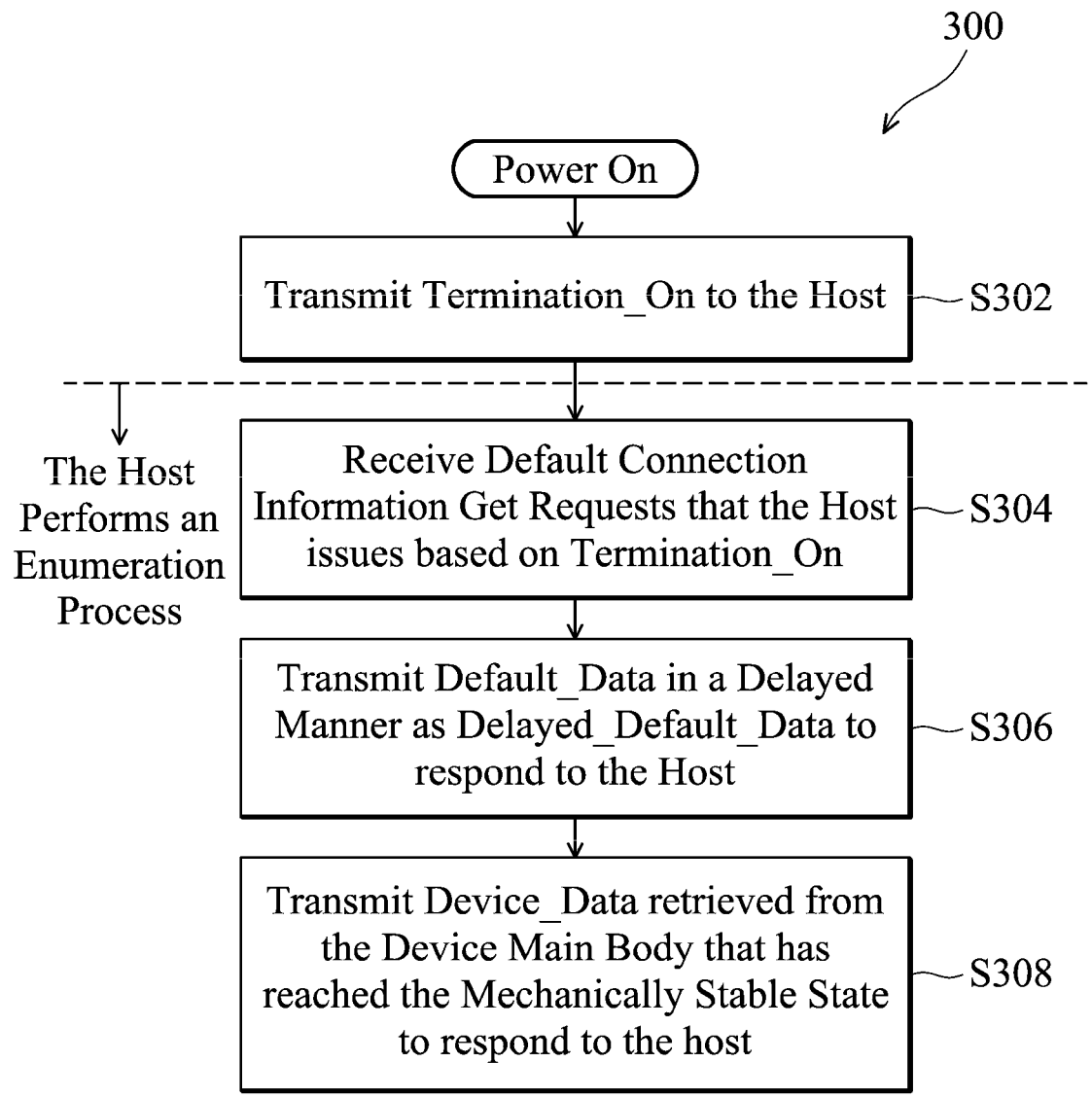
FIG. 3 is a flowchart depicting a control method 300 for an external electronic device.

FIG. 3 is a flowchart depicting a control method 300 for an external electronic device in accordance with an exemplary embodiment of the invention, which is discussed with respect to the block diagram of FIG. 1. When the external electronic device 100 is powered on, the step S302 is performed and thereby the termination-on signal 'Termination_On' is transmitted to the host 106 coupled to the external electronic device 100. After the transmission of termination-on signal 'Termination_On' in step S302, step S304 is performed. In step S304, default link information get requests are received. The host 106 issues the default link information get requests when receiving the termination-on signal 'Termination_On'. In step S306, the default link information get requests are responded in a delayed manner (e.g., the default link information 'Default_Data' are transmitted to the host 106 in a delayed manner as 'Delayed_Default_Data'). Step S308 is performed when the device main body 102 is in the mechanically stable state. In step S308, the specific link information 'Device_Data' retrieved from the device main body 102 is transmitted to the host 106 to respond to the host 106. The host 106 starts to perform an enumeration process when receiving the termination-on signal 'Termination_On'. By the enumeration process, the host 106 issues link information get requests to the external electronic device 100. According to the method 300, steps S304~S308 are provided to perform the enumeration process.

The external electronic device control method of the disclosure may be performed by other computing architectures different from that shown in FIG. 1. Any technique controlling an external electronic device according to the disclosed concepts may relate to the invention.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An external electronic device, comprising: a device main body; and
   an interface controller, coupling the device main body to a host and containing default link information, wherein:
   the interface controller transmits a termination-on signal to the host prior to the device main body reaches a mechanically stable state;
   the interface controller transmits the default link information to the host in a delayed manner to respond to the host when the device main body has not reached the mechanically stable state yet; and
   when the device main body is in the mechanically stable state, the interface controller transmits specific link information retrieved from the device main body to respond to the host;
   the interface controller plans a buffer time period based on a stabilization time required for the device main body, the device main body takes the stabilization time from starting UP to the mechanically stable state; and
   during the buffer time period, the interface controller transmits the default link information to the host in the delayed manner.

2. The external electronic device as claimed in claim 1, wherein:
   the interface controller transmits the termination-on signal to the host when the host wakes up from a sleep mode.

3. The external electronic device as claimed in claim 1, wherein:
   the interface controller transmits the default link information to the host in the delayed manner to respond to default link information get requests that the host issues based on the termination-on signal.

4. The external electronic device as claimed in claim 1, wherein:
   when the device main body has not reached the mechanically stable state yet, the interface controller delays to acknowledge the reception of default link information get requests that the host issues.

5. The external electronic device as claimed in claim 1, wherein:
   the default link information contained in the interface controller includes but not limited to a device descriptor, a configuration descriptor and a Binary Device Object Store type descriptor; and the interface controller respectively transmits the device descriptor, the configuration descriptor and the Binary Device Object Store type descriptor contained in the interface controller to the host in the delayed manner to respond to a device descriptor get request, a configuration descriptor get request and a Binary Device Object Store type descriptor get request issued from the host.

6. The external electronic device as claimed in claim 1, wherein:

the specific link information includes but not limited to a device string descriptor; and the interface controller transmits the device string descriptor retrieved from the device main body to the host to respond to a device string descriptor get request issued from the host.

7. The external electronic device as claimed in claim 1, wherein the device main body is a hard disc.

8. The external electronic device as claimed in claim 1, wherein:

the device main body communicates with the interface controller through a Serial Advanced Technology Attachment interface, and the interface controller communicates with the host through a Universal Serial Bus interface.

9. An interface controller, coupling a device main body to a host, comprising:

a memory, stored with program codes and containing default link information; and a computing unit executing the program codes to transmit a termination-on signal to the host prior to the device main body reaches a mechanically stable state, wherein:

according to the computing unit, the default link information contained in the memory is transmitted to the host in a delayed manner to respond to the host when the device main body has not reached the mechanically stable state yet; and according to the computing unit, specific link information retrieved from the device main body is transmitted to respond to the host when the device main body is in the mechanically stable state;

the interface controller plans a buffer time period based on a stabilization time required for the device main body, the device main body takes the stabilization time from starting UP to the mechanically stable state; and during the buffer time period, the interface controller transmits the default link information to the host in the delayed manner.

10. The interface controller as claimed in claim 9, wherein:

the default link information contained in the memory includes but not limited to a device descriptor, a configuration descriptor and a Binary Device Object Store type descriptor; and the interface controller respectively transmits the device descriptor, the configuration descriptor and the Binary Device Object Store type descriptor contained in the memory to the host in the delayed manner to respond to a device descriptor get request, a configuration descriptor get request and a Binary Device Object Store type descriptor get request issued from the host.

11. The interface controller as claimed in claim 9, wherein:

the specific link information includes but not limited to a device string descriptor; and the interface controller transmits the device string descriptor retrieved from the device main body to the host to respond to a device string descriptor get request issued from the host.

12. The interface controller as claimed in claim 9, wherein:

the interface controller communicates with the device main body through a Serial Advanced Technology Attachment interface; and the interface controller communicates with the host through a Universal Serial Bus interface.

13. An external electronic device control method, comprising: transmitting a termination-on signal to a host coupled to an external electronic device when the external electronic device is powered on;

receiving default link information get requests that the host issues based on the termination-on signal;

responding to the default link information get requests in a delayed manner when a device main body of the external electronic device has not reached a mechanically stable state yet; and transmitting specific link information retrieved from the device main body to respond to the host when the device main body is in the mechanically stable state; wherein:

a buffer time period based on a stabilization time required for the device main body is planned, the device main body takes the stabilization time from starting up to the mechanically stable state; and during the buffer time period, the default link information get requests are responded to in the delayed manner.

14. The external electronic device control method as claimed in claim 13, further comprising:

transmitting the termination-on signal to the host when the host wakes up from a sleep mode.

15. The external electronic device control method as claimed in claim 13, wherein:

when the device main body has not reached the mechanically stable state yet, it is delayed to acknowledge the reception of the default link information get requests.

16. The external electronic device control method as claimed in claim 13, wherein the step of responding to the default link information get requests further comprising:

transmitting default link information contained in an interface controller coupled between the device main body and the host to the host in a delayed manner when the device main body has not reached the mechanically stable state yet.

17. The external electronic device control method as claimed in claim 13, wherein:

the default link information get requests request for a device descriptor, a configuration descriptor and a Binary Device Object Store type descriptor contained in an interface controller coupled between the device main body and the host; and the device descriptor, the configuration descriptor and the Binary Device Object Store type descriptor are respectively transmitted to the host in the delayed manner to respond to a device descriptor get request, a configuration descriptor get request and a Binary Device Object Store type descriptor get request issued from the host.

18. The external electronic device control method as claimed in claim 13, wherein:

the specific link information includes but not limited to a device string descriptor; and the device string descriptor retrieved from the device main body is transmitted to the host to respond to a device string descriptor get request issued from the host.

* * * * *